(12) United States Patent
Renehan

(10) Patent No.: US 6,215,277 B1
(45) Date of Patent: Apr. 10, 2001

(54) ELECTRICAL CHARGING SYSTEM

(75) Inventor: John Francis Renehan, South Lyon, MI (US)

(73) Assignee: Ford Global Tech. Inc, Dearborn, MI (US)

( * ) Notice: Subject to any disclaimer, the term of this patent is extended or adjusted under 35 U.S.C. 154(b) by 0 days.

(21) Appl. No.: 09/505,971

(22) Filed: Feb. 17, 2000

(51) Int. Cl.[7] .................................................. H02J 7/00
(52) U.S. Cl. ................................. 320/117; 320/116
(58) Field of Search ............................ 320/117, 116, 320/125, 126, 121

(56) References Cited

U.S. PATENT DOCUMENTS

| | | | |
|---|---|---|---|
| 4,090,122 | 5/1978 | Hoinski | 320/125 |
| 5,184,109 * | 2/1993 | Tanaka et al. | 340/455 |
| 5,418,401 | 5/1995 | Kaneyuki | 320/125 |
| 5,488,283 | 1/1996 | Dougherty | 320/125 |
| 5,610,499 | 3/1997 | Rogers | 320/137 |
| 5,726,553 | 3/1998 | Waugh | 320/104 |
| 6,057,666 * | 5/2000 | Dougherty et al. | 320/104 |

* cited by examiner

*Primary Examiner*—Peter S. Wong
*Assistant Examiner*—Lawrence Luk
(74) *Attorney, Agent, or Firm*—Ford Global Tech.Inc

(57) ABSTRACT

An electrical charging system 10 which is adapted for use in combination with an automotive vehicle. System 10 includes a conventional controller or control module 12, an alternator 14, a pair of electrical charge storage devices or batteries 16, 18, an electrical switch or relay 24, and a voltage regulating device or regulator 28. System 10 selectively charges batteries 16 and 18 in an efficient and cost-effective manner without compromising the integrity of system 10.

20 Claims, 1 Drawing Sheet

ELECTRICAL CHARGING SYSTEM

FIELD OF THE INVENTION

This invention relates to an electrical charging stem and more particularly, to an electrical charging stem which selectively and efficiently charges a pair batteries.

BACKGROUND OF THE INVENTION

A typical vehicle electrical charging system includes one or more batteries which store and supply electrical power and energy to vehicle's various electrical components and accessories, and an alternator which provides electrical power to the vehicle and which charges the one or more batteries.

One type of electrical charging system, commonly referred to as a dual voltage type electrical system, includes a pair of batteries which have different electrical output voltages (e.g. 12 volts and 36 volts) and which increase the efficiency of the system. One drawback associated with these types of electrical charging systems is that additional or different components are required to charge both of the batteries without compromising the integrity of the system. Particularly, additional components are required to allow the batteries to be charged while continuing to provide voltage to their respective busses.

Efforts have been made to utilize a DC—DC converter to allow the alternator to simultaneously charge the batteries without compromising the integrity of the system. Other attempts have been made which utilize a dual output alternator or a pair of alternators to charge the batteries. While each of these proposed charging systems allow the batteries to be simultaneously charged while continuing to supply power to their respective busses, these systems are relatively expensive to implement and require special packaging constraints. For example and without limitation, DC—DC converters are relatively expensive, large and difficult to install within existing vehicle platforms. Furthermore, DC—DC converters generate an undesirable amount of electromagnetic noise which can interfere with the operation of other electronic components and devices within the vehicle. Dual output alternators and dual alternator systems further require additional electronic and mechanical components which unnecessarily complicate these systems. Moreover, each of these prior systems requires additional charging controllers or control systems which actively maintain the integrity and reliability of these systems.

There is therefore a need for a new and improved electrical charging system which overcomes at least some of the drawbacks of prior systems and which includes a pair of batteries and an alternator that selectively and efficiently charges the pair of batteries.

SUMMARY OF THE INVENTION

It is a first object of the invention to provide an electrical charging system which overcomes some or all of the previously delineated drawbacks associated with prior electrical charging systems.

It is a second object of the invention to provide an electrical charging system having a pair of batteries which provide electrical power at different voltages and an alternator which selectively charges the pair of batteries.

It is a third object of the invention to provide a dual voltage electrical charging system which selectively charges a pair of batteries in a cost-effective manner without compromising the integrity of the system.

According to a first aspect of the present invention a charging system is provided. The charging system is adapted for use in combination with an electrical system of the type having an alternator which provides an output voltage, a first battery, and a second battery. The charging system includes a voltage regulator which is operatively coupled to the alternator and which is effective to selectively cause the output voltage to equal a first voltage value and a second voltage value. A switch is operatively coupled to the first battery, the second battery and the alternator. The switch is movable from a first position in which the first battery is connected to the alternator to a second position in which the second battery is connected to the alternator. The system further includes a controller which is communicatively coupled to the voltage regulator and to the switch, the controller being effective to cause the switch to move from the first position to the second position, the controller further being effective to cause the voltage regulator to cause the output voltage to equal the first voltage value when the switch is in the first position and to equal the second voltage value when the switch is in the second position, thereby selectively charging the first and the second battery.

According to a second aspect of the present invention, a method for controlling the charging of a first battery and a second battery is provided. The first battery and the second battery are contained within an electrical system including an alternator. The method includes the steps of connecting the first battery to the alternator for a first period of time; causing the alternator to generate a first output voltage for the first period of time, thereby charging the first battery; causing the alternator to shut off for a second period of time; disconnecting the first battery from the alternator; connecting the second battery to the alternator for a third period of time; and causing the alternator to generate a second output voltage for the third period of time, thereby charging the second battery.

These and other features, advantages, and objects of the invention will become apparent by reference to the following specification and by reference to the following drawings.

DETAILED DESCRIPTION OF THE PREFERRED EMBODIMENT OF THE INVENTION

Figure 1:
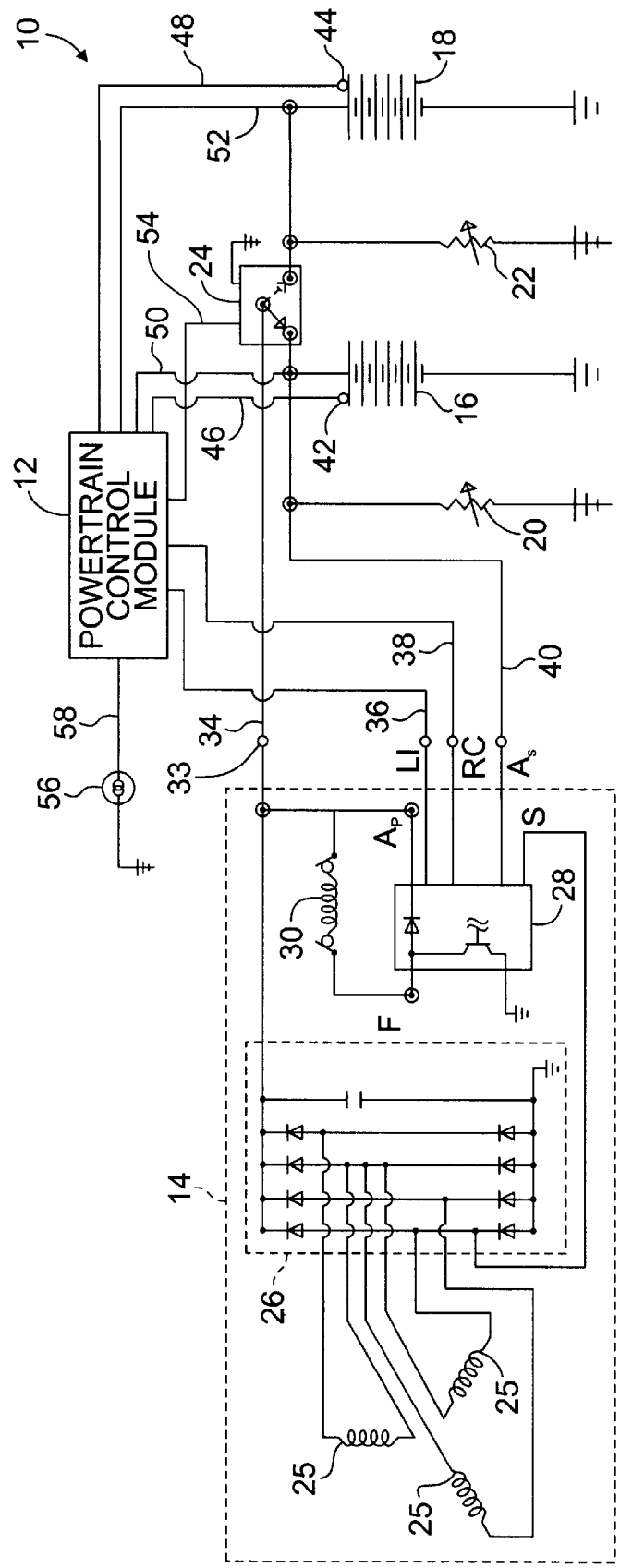
FIG. 1 is a schematic diagram illustrating an electrical charging system which is made in accordance with the teachings of the preferred embodiment of the invention.

Referring now to FIG. 1, there is shown an electrical generating or charging system 10 which is made in accordance with the teachings of the preferred embodiment of the invention and which is adapted for use in combination with the electrical system of an automotive vehicle. As shown, system 10 includes a conventional controller or control module 12, an alternator 14, a pair of electrical charge storage devices or batteries 16, 18, an electrical switch or relay 24, and a voltage regulating device or regulator 28. Batteries 16, 18 respectively and selectively supply electrical power and voltage to variable loads 20, 22, which represent various automotive electrical components and accessories.

In the preferred embodiment of the invention, control module or controller 12 is a conventional and commercially available vehicle powertrain control module including one or more microprocessors and/or integrated circuits which operate under stored program control and which cooperatively perform the below-described calculations and/or processes. In alternate embodiments, controller 12 may comprise a separate external controller or a controller which is wholly contained within regulator 28. Controller 12 is electrically and communicatively coupled to terminals "RC" and "LI" of voltage regulator 28 by use of conventional busses or paths 36, 38, respectively, and is effective to control the operation or output of regulator 28. That is, controller 12 selectively generates a pulse-width-modulated ("PWM") signal and communicates the generated PWM signal to terminal RC of regulator 28 by use of bus 38. As described more fully and completely below, the duty cycle of the PWM signal (i.e., the amount or percentage of the cycle time for which the signal is activated or "enabled") causes regulator 28 to regulate the voltage output of alternator 14. In one non-limiting embodiment the voltage output from alternator 14 is proportional to the duty cycle of the controller-generated PWM signal, and is selectively determined or "chosen" by controller 12 by use of one or more predetermined stored tables or matrixes.

Controller 12 is further electrically and communicatively coupled to a pair of conventional temperature sensors 42, 44 by use of busses 46, 48, respectively. Temperature sensors 42, 44 are operatively coupled to batteries 16 and 18 in a conventional manner and are effective to measure the temperature of batteries 16 and 18 and to communicate signals to controller 12 based upon the measured temperature(s). Controller 12 is further respectively coupled to batteries 16, 18 by use busses 50, 52, which allow controller 12 to detect or measure the approximate output voltage of batteries 16, 18. Controller 12 utilizes the generated "temperature" signals, the battery voltage measurements, and other stored and/or measured data to estimate the state-of-charge of each battery 16, 18 in a conventional manner.

Controller 12 is electrically and communicatively coupled to electrical switch or relay 24 by use of bus 54, and is effective to selectively generate signals to relay 24, thereby causing relay 24 to actuate or to switch between the two positions shown in FIG. 1 (e.g., either connecting battery 16 to bus 34 or connecting battery 18 to bus 34). Controller 12 is further coupled to an audio and/or visual warning indicator 56 (e.g., a light and/or speaker) by use of bus 58, and is effective to activate warning indicator 56 if controller 12 senses or determines the existence of a fault condition within system 10 (e.g., a malfunction of alternator 14).

Alternator 14 is a conventional vehicle high output alternator including three-phase stator coils 25 and a rectifier 26, which rectifies or converts the three-phase alternating-current ("AC") power output of stator coils 25 into a direct-current ("DC") power output which is provided at output terminal 33. In the preferred embodiment, alternator 14 further includes voltage regulator 28 which is effective to control the output voltage of alternator 14. In other alternate embodiments, regulator 28 is a separate or disparate component or device which is externally coupled to alternator 14.

In the preferred embodiment, voltage regulator 28 operates under PWM signal control and may be substantially similar in structure and function to the voltage regulator(s) described within the following patents which are each assigned to the present assignee and which are each fully and completely incorporated herein by reference: U.S. Pat. No. 5,745,534 of DeBiasi et al., U.S. Pat. No. 5,481,176 of DeBiasi et al., and U.S. Pat. No. 5,644,213 of Renehan. Voltage regulator 28 includes an AP terminal through which regulator 28 senses the DC output of rectifier 20, and an $A_s$ terminal through which regulator 28 senses the voltage over bus 40.

Voltage regulator 28 further includes a "regulator control" or an "RC" terminal and a "load indicator" or an "LI" terminal, which are each communicatively coupled to control module 12 and which selectively receive and transmit PWM signals to and from controller 12.

Particularly, regulator 28 senses the voltage output at terminal 33 and communicates a PWM signal representing the sensed voltage to controller 12 by use of terminal LI and bus 36. Terminal "F" or the "field terminal" of regulator 28 allows voltage regulator 28 to selectively control the current through field coil 24, thereby regulating the voltage output of alternator 14 in a known and conventional manner. Terminal "S" or the "stator terminal" of regulator 28 allows regulator 26 to sense the output voltage of one of stator coils 25, thereby allowing regulator 28 to detect faults or fault conditions within alternator 14 in a known and conventional manner.

In the preferred embodiment, battery 16 is a conventional "12-volt" DC type vehicle battery which provides electrical power at a voltage of approximately 14 volts. Battery 18 is a conventional 36-volt DC type vehicle battery which provides electrical power at a voltage of approximately 42 volts. In other alternate embodiments, batteries 16, 18 have different output voltages. Batteries 16, 18 are each respectively and operatively coupled to a plurality of conventional variable electrical loads 20, 22. Variable loads 20 include relatively low voltage automotive electrical components and accessories (e.g., radio, power locks, power windows, interior lights, and/or head lamps) which may be selectively activated and deactivated, and which are able to operate or run by use of the voltage output provided by battery 16. Variable loads 22 include relatively higher voltage automotive electrical components and accessories (e.g., the vehicle starter, blower and/or heater) which may be selectively activated and deactivated, and which are able to operate or run by use of the voltage output provided by battery 18.

In the preferred embodiment of the invention electrical switch 24 comprises a conventional relay, such as a solid state or an electromechanical relay. Switch 24 is electrically connected to the output terminal 33 of alternator 14 by use of electrical path or bus 34, and operates in a conventional manner and under the control of controller 12 to selectively connect and disconnect output terminal 33 to battery 16 and to battery 18.

In operation, when the vehicle is "started", relay 24 resides in the position illustrated in phantom in FIG. 1 and connects bus 34 to battery 18 and variable loads 22. When relay 24 resides in this position, alternator 14 is able to "replenish" or charge battery 18 which may be "depleted" or discharged after having delivered power to the vehicle's starter. Once the vehicle has started, controller 12 selectively generates a PWM signal to regulator 28 by use of bus 38. The generated signal from controller 12 has a duty cycle that corresponds to a relatively "high" voltage output that is desired from alternator 14. Particularly, the generated PWM signal from controller 12 "instructs" regulator 28 to cause the alternator 14 to provide a relatively high voltage output (e.g., a voltage which is effective to charge battery 18) at terminal 33. Regulator 28 receives the signal(s) generated from controller 12 at terminal RC and energizes field coil 30 in a manner which substantially regulates the alternator output at terminal 33 and causes it to equal a relatively high voltage value. In one non-limiting embodiment, the relatively high voltage output is equal to approximately 42 volts and is effective to recharge battery 18 and to supply electrical power to electrical accessories or components 22.

Regulator 28 senses the output voltage of alternator 14 (i.e., the voltage at terminal 33) through terminal Ap and communicates a "feedback" PWM signal to controller 12 by use of terminal LI and bus 38. The communicated "feedback" PWM signal is effective to "inform" controller 12 of the current voltage output of the system 10 and of any fault information or conditions (e.g., any malfunctioning of alternator 14). Controller 12 allows battery 18 to charge for a period of time or a "high voltage charging time". The "high voltage charging time" is stored, calculated and/or determined within controller 12 and may be a function of the sensed temperature of each of the batteries 16, 18, the sensed output voltage of each of the batteries 16, 18, and/or the estimated state-of-charge of each of the batteries 16, 18. In one non-limiting embodiment the "high voltage charging time" is equal to the amount of time required to fully recharge battery 18 or until battery 16 becomes substantially discharged or "depleted".

When controller 12 determines that battery 18 is sufficiently recharged or that battery 16 requires charging, controller 12 generates a PWM signal to regulator 28 which is effective to cause regulator 28 to "shut off" alternator 14 and/or to cause the output voltage at terminal 33 to equal approximately zero volts. Regulator 28 continues to provide a "feedback" signal to controller 12, informing controller 12 of the sensed voltage at terminal 33.

Once the voltage at terminal 33 becomes equal to approximately zero volts (i.e., once the stored energy within alternator 14 is substantially depleted), controller 12 causes relay 24 to switch position, thereby disconnecting battery 18 from bus 34 and connecting battery 16 to bus 34. Controller 12 then generates a PWM signal to regulator 28, which is effective to cause regulator 28 to restart alternator 14 and to cause the output voltage at terminal 33 to equal a desired and relatively "low" voltage value. Particularly, regulator 28 receives the controller-generated signal(s) at terminal "RC" and energizes field coil 30 in a manner which substantially regulates the alternator output at terminal 33 and causes it to equal a relatively low voltage (e.g., a voltage which is effective to charge battery 16). In one non-limiting embodiment, the relatively low voltage output value is equal to approximately 14 volts and is effective to charge battery 16 and to supply electrical power to electrical accessories or components 20.

Regulator 28 senses the voltage on bus 40 by use of terminal $A_s$ and communicates this voltage value to controller 12 by use of a PWM signal communicated over terminal LI and bus 36. After a period of time or a "low voltage charging time" has elapsed, system 10 repeats the above-described switching process and returns to charging battery 18. That is, controller 12 causes regulator 28 to "shut off" alternator 12, and after the voltage at terminal 33 is approximately equal to zero volts, controller 12 actuates relay 24, thereby disconnecting battery 16 from bus 34 and reconnecting battery 18 to bus 34. Controller 12 determines or calculates the "low voltage charging time" in a manner substantially similar to the "high voltage charging time" (e.g., the "low voltage charging time" is a function of the estimated state-of-charge of batteries 16, 18).

It should be appreciated that system 10 efficiently and selectively charges each of the batteries 16, 18 without compromising the integrity of system 10. Particularly, system 10 selectively charges each battery 16, 18, while the other battery provides power to its respective variable loads 20, 22. In contrast to prior dual voltage electrical charging systems which charge batteries simultaneously, system 10 achieves this selective or "interval" charging strategy in a relatively cost effective manner using standard electrical components, and without requiring a DC—DC converter, a dual-output alternator, or a dual alternator system.

It should be understood that the inventions described herein are provided by way of example only and that numerous changes, alterations, modifications, and substitutions may be made without departing from the spirit and scope of the inventions as delineated within the following claims.

What is claimed is:

1. A charging system for use in combination with an electrical system of the type having an alternator which provides an output voltage, a first battery, and a second battery, said charging system comprising:

a voltage regulator which is operatively coupled to said alternator and which is effective to selectively cause said output voltage to equal a first voltage value and a second voltage value;

a switch which is operatively coupled to said first battery, said second battery and said alternator, said switch being movable from a first position in which said first battery is connected to said alternator and said second battery is disconnected from said alternator to a second position in which said second battery is connected to said alternator and said first battery is disconnected from said alternator; and a controller which is communicatively coupled to said voltage regulator and to said switch, said controller being effective to cause said switch to move from said first position to said second position, said controller further being effective to cause said voltage regulator to cause said output voltage to equal said first voltage value when said switch is in said first position and to equal said second voltage value when said switch is in said second position, thereby selectively and alternately charging said first and said second battery.

2. The charging system of claim 1 wherein said controller is further effective to estimate a state-of-charge of said first battery and said second battery, and wherein said controller causes said switch to move from said first position to said second position based upon said estimated state-of-charge of said first battery and said second battery.

3. The charging system of claim 1 wherein said controller is further effective to cause said regulator to cause said output voltage to equal approximately zero volts before causing said switch to move from said first position to said second position.

4. The charging system of claim 1 wherein said first battery comprises a 36 volt battery.

5. The charging system of claim 4 wherein said second battery comprises a 12 volt battery.

6. The charging system of claim 1 wherein said switch comprises a solid-state relay.

7. The charging system of claim 1 wherein said switch comprises an electromechanical relay.

8. The charging system of claim 1 wherein said voltage regulator is contained within said alternator.

9. An automotive electrical system comprising:

a first battery of a first voltage;

a second battery of a second voltage;

an alternator which selectively provides a first output voltage and a second output voltage;

a relay which is connected to said first battery, to said second battery and to said alternator, said relay being effective to selectively connect said first battery and said second battery to said alternator; and a controller which is communicatively coupled to said alternator and to said relay, and which is effective to cause said relay to connect said first battery to said alternator while disconnecting said second battery from said alternator, and to connect said second battery to said alternator while disconnecting said first battery from said alternator, said controller further being effective to cause said alternator to provide said first output voltage when said first battery is connected to said alternator and to provide said second output voltage when said second battery is connected to said alternator, thereby selectively charging said first and said second batteries.

10. The automotive electrical system of claim 9 wherein said alternator includes a voltage regulator which is effective to cause said alternator to selectively provide said first and said second output voltage.

11. The automotive electrical system of claim 9 wherein said voltage regulator is communicatively coupled to said controller and is effective to measure said first output voltage and said second output voltage and to communicate feedback signals to said controller based upon said measured first and second output voltages.

12. The automotive electrical system of claim 11 wherein said controller is further effective to receive said feedback signals and to detect the existence of a fault condition based upon said received feedback signals.

13. The automotive electrical system of claim 9 wherein said controller is further effective to estimate a first state-of-charge of said first battery, and to selectively connect said first battery to said alternator based upon said estimated first state-of-charge.

14. The automotive electrical system of claim 9 wherein said relay comprises a solid state relay.

15. The automotive electrical system of claim 9 wherein said relay comprises an electromagnetic relay.

16. A method for charging a first battery and a second battery which are contained within an electrical system including an alternator, said method comprising the steps of:

connecting said first battery to said alternator for a first period of time;

causing said alternator to generate a first output voltage for said first period of time, thereby charging said first battery;

causing said alternator to shut off for a second period of time;

disconnecting said first battery from said alternator;

connecting said second battery to said alternator for a third period of time; and causing said alternator to generate a second output voltage for said third period of time, thereby charging said second battery.

17. The method of claim 16 further comprising the steps of:

providing a voltage regulator;

operatively coupling said voltage regulator to said alternator; and wherein said voltage regulator is effective to selectively cause said alternator to generate said first output voltage for said first period of time, to cause said alternator to shut off for said second period of time, and to cause said alternator to generate said second output voltage for said third period of time.

18. The method of claim 17 further comprising the steps of:

providing a relay;

operatively coupling said relay to said first battery, said second battery and said alternator; and selectively actuating said relay effective to selectively connect said first battery and said second battery to said alternator.

19. The method of claim 16 wherein said first output voltage is equal to approximately 42 volts.

20. The method of claim 19 wherein said second output voltage is equal to approximately 14 volts.

* * * * *